(12) United States Patent
Hughes

(10) Patent No.: US 9,347,375 B2
(45) Date of Patent: May 24, 2016

(54) HOT EGR DRIVEN BY TURBOMACHINERY

(75) Inventor: Michael John Hughes, Greer, SC (US)

(73) Assignee: General Electronic Company, Schenectady, NY (US)

( * ) Notice: Subject to any disclaimer, the term of this patent is extended or adjusted under 35 U.S.C. 154(b) by 924 days.

(21) Appl. No.: 13/531,262

(22) Filed: Jun. 22, 2012

(65) Prior Publication Data

US 2013/0340404 A1  Dec. 26, 2013

(51) Int. Cl.
| | |
|---|---|
| F23C 9/00 | (2006.01) |
| F02C 7/08 | (2006.01) |
| F02C 3/14 | (2006.01) |
| F02C 3/34 | (2006.01) |
| F23R 3/00 | (2006.01) |
| F23R 3/04 | (2006.01) |
| F23R 3/28 | (2006.01) |
| F23R 3/06 | (2006.01) |

(52) U.S. Cl.
CPC ... *F02C 7/08* (2013.01); *F02C 3/14* (2013.01); *F02C 3/34* (2013.01); *F23C 9/00* (2013.01); *F23R 3/005* (2013.01); *F23R 3/04* (2013.01); *F23R 3/286* (2013.01); *F23C 9/006* (2013.01); *F23C 2202/30* (2013.01); *F23C 2202/50* (2013.01); *F23C 2900/09001* (2013.01); *F23R 3/06* (2013.01); *Y02T 50/675* (2013.01)

(58) Field of Classification Search
CPC ........ F23C 9/00; F23C 9/006; F23C 2202/30; F23C 2900/09001; F23R 3/06
See application file for complete search history.

(56) References Cited

U.S. PATENT DOCUMENTS

| | | | | |
|---|---|---|---|---|
| 3,319,692 A | * | 5/1967 | Reba et al. | 431/116 |
| 3,744,242 A | * | 7/1973 | Stettler et al. | 431/116 |
| 3,754,393 A | * | 8/1973 | Handa | 60/750 |
| 3,927,958 A | * | 12/1975 | Quinn | 431/116 |
| 4,130,388 A | * | 12/1978 | Flanagan | 431/116 |
| 5,044,932 A | * | 9/1991 | Martin et al. | 431/116 |
| 5,092,761 A | * | 3/1992 | Dinicolantonio | 431/115 |
| 5,412,938 A | * | 5/1995 | Keller | 60/39.21 |
| 5,584,182 A | | 12/1996 | Althaus et al. | |
| 6,136,279 A | * | 10/2000 | Stahl | 422/625 |
| 6,305,155 B1 | * | 10/2001 | Gross | 60/782 |
| 6,363,709 B2 | | 4/2002 | Kataoka et al. | |
| 6,524,098 B1 | * | 2/2003 | Tsirulnikov et al. | 431/9 |
| 6,598,402 B2 | | 7/2003 | Kataoka et al. | |
| 6,672,863 B2 | | 1/2004 | Doebbeling et al. | |
| 7,425,127 B2 | | 9/2008 | Zinn et al. | |
| 2008/0309087 A1 | | 12/2008 | Evulet et al. | |
| 2011/0167828 A1 | * | 7/2011 | Singh et al. | 60/740 |

* cited by examiner

*Primary Examiner* — Lorne Meade
(74) *Attorney, Agent, or Firm* — Fletcher Yoder, PC

(57) ABSTRACT

In one embodiment, a system includes a turbine combustor of a turbine system with the turbine combustor at least partially enclosed within a compressor discharge casing. The turbine system also includes an exhaust gas recovery system that includes an exhaust gas recirculation duct. The exhaust gas recirculation duct is configured to recirculate exhaust gas from a downstream end of the turbine combustor to an upstream end of the turbine combustor. This exhaust gas recirculation duct is entirely enclosed within the compressor discharge casing.

17 Claims, 7 Drawing Sheets

HOT EGR DRIVEN BY TURBOMACHINERY

BACKGROUND OF THE INVENTION

The subject matter disclosed herein relates to gas turbine engines and, more specifically, to recirculating exhaust gases through a gas turbine engine.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. In certain configurations, fuel and air are pre-mixed prior to ignition to reduce emissions and improve combustion. Fuel combusted at stoichiometric conditions consumes substantially all oxygen from the air and all fuel. However, combustion near stoichiometric conditions with atmospheric oxygen concentrations may lead to high temperatures and high $NO_x$ emissions.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine combustor of a turbine system with the turbine combustor at least partially enclosed within a compressor discharge casing. The turbine system also includes an exhaust gas recovery system that includes an exhaust gas recirculation duct. The exhaust gas recirculation duct is configured to recirculate exhaust gas from a downstream end of the turbine combustor to an upstream end of the turbine combustor. This exhaust gas recirculation duct is entirely enclosed within the compressor discharge casing.

In a second embodiment, a system includes a turbine combustor of a turbine system with the turbine combustor at least partially enclosed within a compressor discharge casing. The system also includes an exhaust gas recovery system. The exhaust gas recirculation system includes an exhaust gas recirculation duct configured to recirculate exhaust gas from a downstream end of the turbine combustor to an upstream end of the turbine combustor. The exhaust gas recirculation system also includes a cooling stage configured to decrease a temperature of the exhaust gas recirculated through the exhaust gas recirculation duct and a pressure increasing device configured to increase a pressure of the exhaust gas recirculated through the exhaust gas recirculation duct. The exhaust gas recirculation duct, the cooling stage, and the pressure increasing device are all entirely enclosed within the compressor discharge casing.

In a third embodiment, a system includes a turbine combustor of a turbine system with the turbine combustor at least partially enclosed within a compressor discharge casing. The turbine system also includes an exhaust gas recovery system that includes an exhaust gas recirculation duct. The exhaust gas recovery system is configured to recirculate exhaust gas from a downstream end of the turbine combustor to an upstream end of the turbine combustor. This exhaust gas recirculation duct is entirely enclosed within the compressor discharge casing. The system further includes a compressor of the turbine system that is coupled to a rotating shaft of the turbine system such that the rotation of the rotating shaft causes blades of the compressor to rotate to deliver compressed air to a head end of the turbine combustor. The system also includes a turbomachinery stage with a rotating stage and a stationary stage, both of which are at least partially disposed within the exhaust gas recirculation duct. The rotating stage is coupled to the rotating shaft of the turbine system such that rotation of the rotating shaft causes the rotating stage to rotate with respect to the stationary stage to cause the exhaust gas to be recirculated through the exhaust gas recirculation duct.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An exhaust gas recovery (EGR) system as described herein recirculates exhaust gases internally within the gas turbine without utilizing any systems external to the gas turbine. The EGR system as described herein recirculates a portion of exhaust gases to dilute the oxygen concentration of an air/fuel mixture and affect emissions produced by the gas turbine. The EGR system as described herein provides for numerous dynamic adjustments to the quantity and degree of pressurization of the exhaust gas portion. For example, under certain operating conditions, a smaller portion of the exhaust gases may be recirculated, while under other operating conditions a larger portion of the exhaust gases may be recirculated. Additionally, the EGR system as described herein is not dependent upon available static pressure, such as with ejectors or fluidics. Rather, systems internal to the gas turbine actively impart enough potential energy to the exhaust gas portion to force recirculation by overcoming the combustor upstream pressure. The EGR as described herein also does not require recirculation of a portion of the exhaust gases back into the combustion system using external machinery to cool the exhaust gases or remove water from the exhaust gases. As a result, the gas turbine with exhaust gas recirculation may be simplified, the number of skids may be reduced, and the number of additional components may be minimized.

Figure 1:
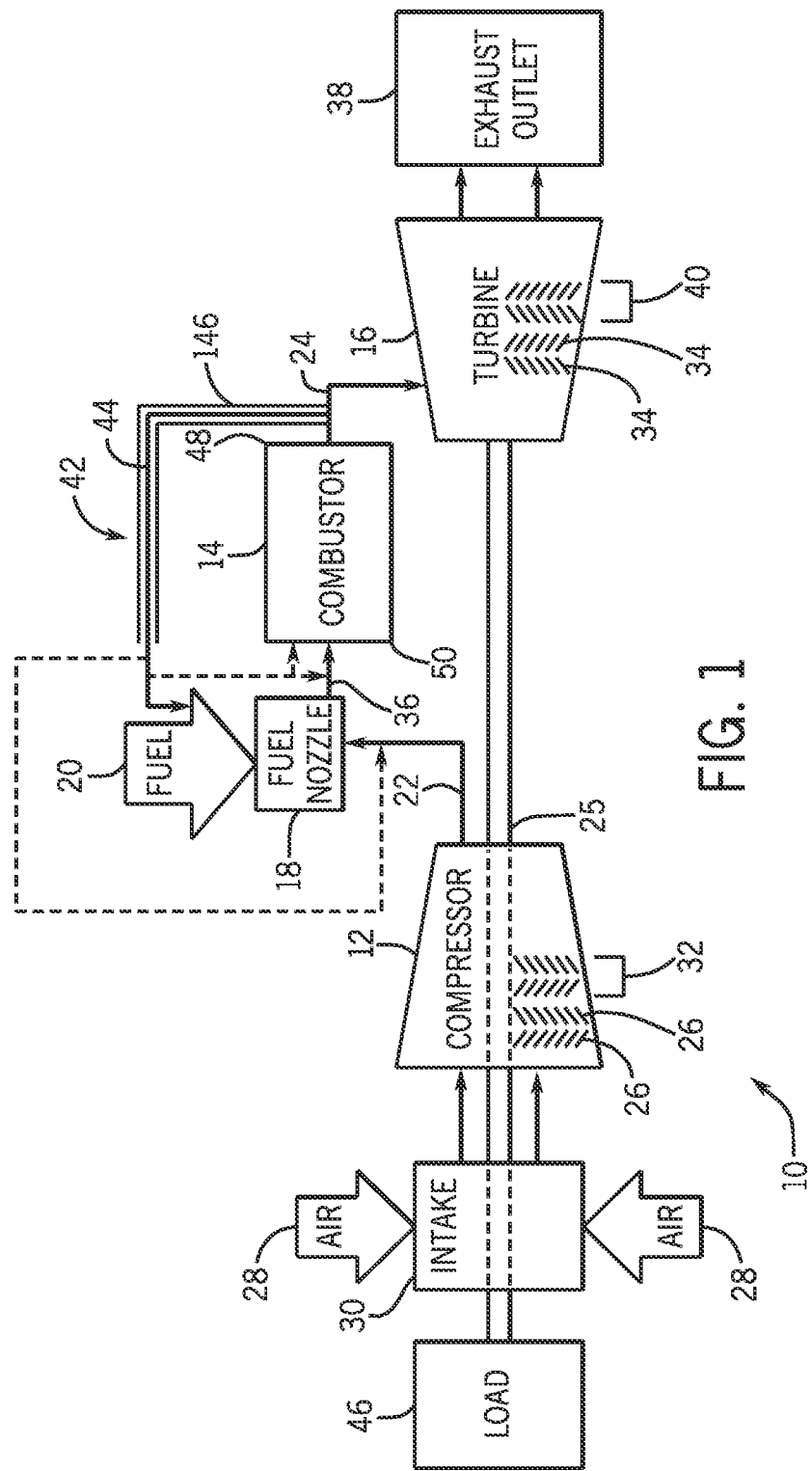
FIG. 1 is a block diagram of a turbine system including an embodiment of a exhaust gas recovery (EGR) system as described herein.

Turning now to the drawings, FIG. 1 illustrates a block diagram of an embodiment of a gas turbine system 10, which may internally recirculate exhaust gases in accordance with present embodiments. The gas turbine system 10 includes a compressor 12, turbine combustor 14, and a turbine 16. The turbine combustor 14 includes a plurality of fuel nozzles 18 which route a fuel 20 into the turbine combustor 14. In certain embodiments, the fuel nozzles 18 are arranged around a central fuel nozzle 18. The fuel nozzles 18 may be can-type nozzles or sector nozzles. In addition, the compressor 12 directs compressed air 22 into the turbine combustor 14. At least some of the compressed air 22 is mixed with the fuel 20 in the fuel nozzles 18 to be burned in the turbine combustor 14. Once burned, the compressed air 22 and fuel 20 form exhaust gases 24 that pass through the turbine 16, rotating a turbine shaft 25. As the turbine shaft 25 rotates, compressor blades 26 within the compressor 12 rotate, thereby compressing air 28 from an air intake 30 to form the compressed air 22. The compressor 12 may have multiple stages 32, with each stage including both rotating and stationary compressor blades 26. Each stage compresses the air 28 to a pressure higher than the previous stage.

From the compressor 12, the compressed air 22 may pass downstream to the turbine combustor 14. The compressed air 22 may be used for a variety of purposes within the gas turbine system 10, including mixing with the fuel 20 for combustion in the turbine combustor 14, cooling portions of the gas turbine system 10, such as the turbine combustor 14, compressor blades 26, and/or turbine blades 34. As described in greater detail below, the compressed air 22 may also be used downstream as dilution air in the turbine combustor 14 to cool the exhaust gases 24. As depicted, the fuel nozzles 18 mix the fuel 20 with the compressed air 22 upstream from the turbine combustor 14, and distribute the air/fuel mixture 36 into the turbine combustor 14 in a suitable ratio for optimal combustion, which may account for factors such as emissions, fuel consumption, and power output. Much of the compressed air 22 is mixed with the fuel 20 in the fuel nozzles 18 within the turbine combustor 14. The fuel 20 may be a liquid fuel and/or gas fuel, such as natural gas or syngas.

The air/fuel mixture 36 combusts within the turbine combustor 14, thereby creating the pressurized exhaust gases 24. The turbine combustor 14 directs the exhaust gases 24 through a downstream end 48 toward a turbine 16 toward an exhaust outlet 38. As the exhaust gases 24 pass through the turbine 16, turbine blades 34 may be forced to rotate about the attached turbine shaft 25. Like the compressor 12, each stage 40 of the turbine 16 may include rotating and stationary turbine blades 34. The exhaust gases 24 may have lower oxygen concentrations than the compressed air 22 mixed with the fuel 20. A EGR system 42, as described in greater detail below, may divert some of the exhaust gases 24 from the downstream end 48 (e.g., an exhaust gas portion 44) to be recirculated to an upstream end 50 of the turbine combustor 14 and mixed with the fuel 20 and/or the compressed air 22 in the fuel nozzles 18 and/or the turbine combustor 14. More specifically, in certain embodiments, the EGR system 42 may include one or more ducts 146 through which the exhaust gas portion 44 may be recirculated from the downstream end 48 to the upstream end 50. The one or more ducts 146 may include one or more conduits, pipes, or other passages to convey the exhaust gas portion 44 to a component of the gas turbine system 10. The recirculated exhaust gas portion 44 will again pass through the turbine combustor 14 and the turbine 16 to produce work via the turbine shaft 25.

As illustrated in FIG. 1, the turbine shaft 25 may be coupled to various components of the gas turbine system 10, including the compressor 12, the turbine 16, and a load 46. The load 46 may be a vehicle or a stationary load, such as a propeller on an aircraft or an electrical generator in a power plant, for example. The load 46 may include any suitable device capable of being powered by the rotational output of the gas turbine system 10.

Figure 2:
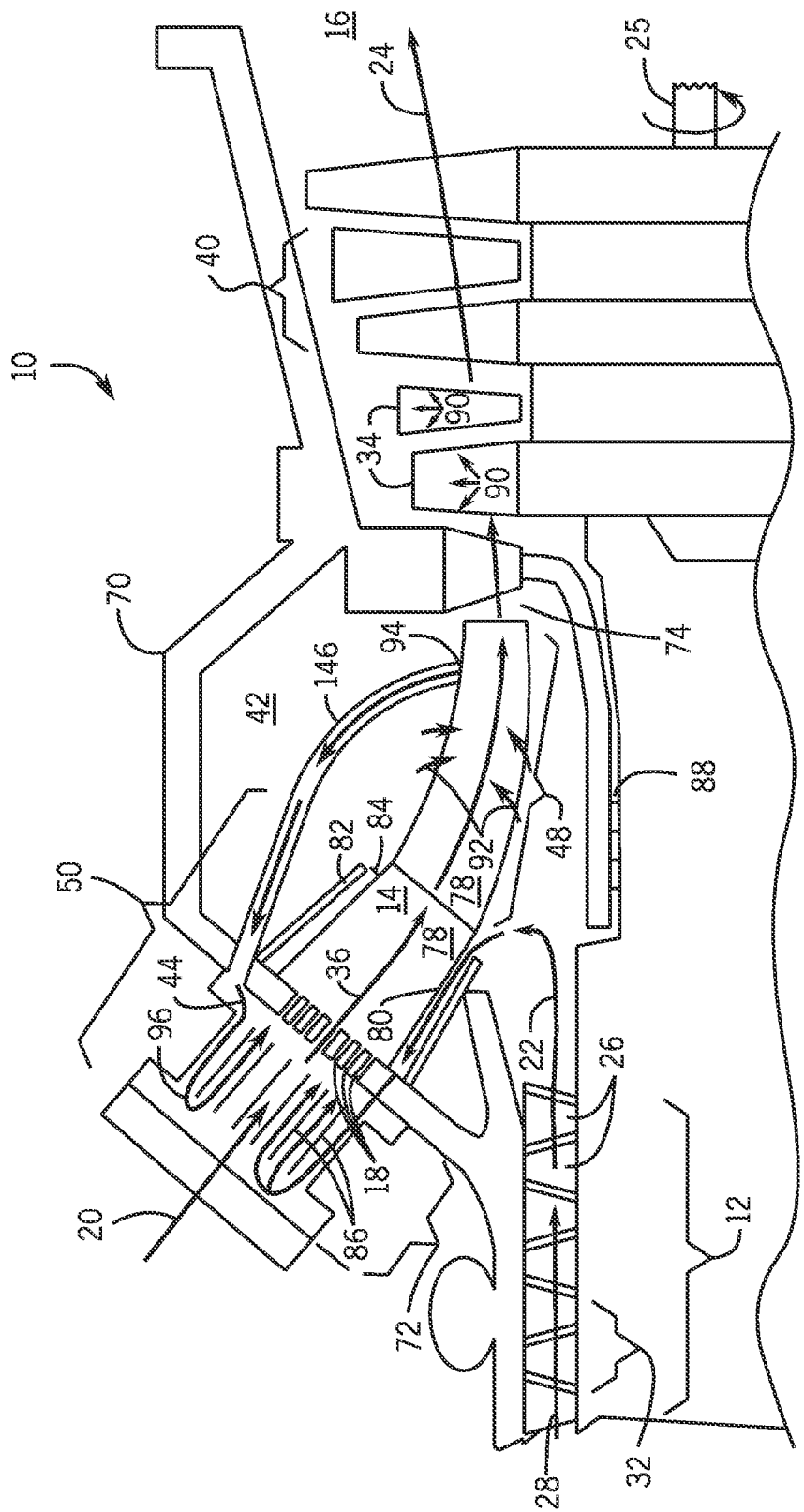
FIG. 2 is a cross-sectional side view of an embodiment of the turbine combustor of FIG. 1 including recirculation of a portion of exhaust gases.

FIG. 2 is a schematic of an embodiment of a turbine combustor 14 of FIG. 1, including the EGR system 42. As described above, the compressor 12 compresses air 28 with the compressor blades 26 to produce a flow of compressed air 22. The compressed air 22 may be used in the combustion process within the turbine combustor 14, but may also be used to cool components of the gas turbine system 10, including the turbine combustor 14, the compressor 12, and/or the turbine 16. As shown in the embodiment illustrated in FIG. 2, a compressor discharge casing 70 operatively coupled to the turbine combustor 14 receives the compressed air 22 from the compressor 12. From the compressor discharge casing 70, the compressed air 22 may flow into the turbine combustor 14, as described in greater detail below.

The turbine combustor 14 has numerous relevant components, including at least a head end 72, an exhaust end 74, the plurality of fuel nozzles 18, a combustion chamber 78, a liner 80, a flow sleeve 82, and an annulus 84 between the liner 80 and the flow sleeve 82. The head end 72 is upstream and opposite the exhaust end 74. The head end 72 receives the fuel 20 and the compressed air 22. The compressed air may be directed into the head end 72 from the compressor discharge casing 70 through the annulus 84 between the liner 80 and the flow sleeve 82. More specifically, the fuel nozzles 18 disposed within the head end 72 receive the fuel 20 and the compressed air 22. The head end 72 may include numerous passages 86 for the compressed air 22 to enter each of the plurality of fuel nozzles 18. As described above, the fuel 20 may be directed into each fuel nozzle 18, creating an air/fuel mixture 36 with the compressed air 22. Each fuel nozzle 18 injects the air/fuel mixture 36 into the combustion chamber 78 to be combusted, producing the high temperature exhaust gases 24. The liner 80 may contain the combustion within the combustion chamber 78.

The flow sleeve 82 may be disposed outside to enclose the liner 80, leaving the annulus 84 between the liner 80 and the flow sleeve 82. Again, the annulus 84 is in fluid connection with the compressor discharge casing 70 so that the compressed air 22 may pass through the annulus 84 before entering the head end 72. As such, the annulus 84 is upstream of the head end 72. Due to the high temperatures of the exhaust gases 24 in the combustion chamber 78, the compressed air 22 may be warmed by the liner 80 before entering the head end 72. In some embodiments, as shown in FIG. 2, the compressor discharge casing 70 entirely encloses the combustion chamber 78 and flow sleeve 82, but not the head end 72. However, in other embodiments, the compressor discharge casing 70 entirely encloses the entire turbine combustor 14, including the head end 72. In certain embodiments, a high pressure packing seal 88 may be placed in the compressor discharge casing 70 between the compressor 12 and the turbine 16 to limit the passage of fluids between the compressor 12 and the turbine 16.

As mentioned above, some of the compressed air 22 may be used to cool components of the gas turbine system 10. More specifically, the compressed air 22 that does not pass through the combustion chamber 78 may be used as cooling air 90 or dilution air 92. To improve the performance of the turbine blades 34 exposed to the exhaust gases 24, in certain embodiments, some of the turbine blades 34 may incorporate cooling features such as convection cooling; film cooling, transpiration cooling, and combinations thereof. Turbine blades 34 with convection cooling circulate cooling air 90 through internal passages. Turbine blades 34 with film cooling pump cooling air 90 out of small holes in the turbine blade 34 to create a thin layer of cooling air 90 to protect the turbine blade 34 against high temperatures. Transpiration cooling is similar to film cooling, however, the cooling air 90 is pumped through a porous shell rather than small holes. The cooling air 90 may be used in similar ways to cool the liner 80.

Another method of improving the performance of the turbine blades 34 operating in high temperature exhaust gases 24 is to dilute the exhaust gases 24 before they reach the turbine blades 34. Dilution air 92 may be emitted into the combustion chamber 78 to lower the temperature of the exhaust gases 24. The dilution air 92 or cooling air 90 may be drawn from inside the compressor discharge casing 70, after a certain compressor stage 32, or from the compressed air 22.

The compressed air 22 to be mixed with the fuel 20 in the fuel nozzles 18 of the turbine combustor 14 may have a certain oxygen concentration. For example, the compressed air 22 may have between approximately 15-25% oxygen, with the balance (e.g., 75-85%) being primarily nitrogen. An air/fuel mixture 36 may be a stoichiometric mixture if just enough oxygen is provided to completely react with all the fuel 20. Air/fuel mixtures with more oxygen than a stoichiometric air/fuel mixture may be called lean air/fuel mixtures, and air/fuel mixtures with less oxygen than a stoichiometric air/fuel mixture may be called rich air/fuel mixtures. Combusted rich air/fuel mixtures leave uncombusted fuel in the exhaust and are thus less fuel efficient than lean air/fuel mixtures. Stoichiometric air/fuel mixtures may burn hotter than lean air/fuel mixtures. High combustion temperatures often produce undesirable and potentially harmful nitrogen oxide ($NO_x$) emissions.

Stoichiometric air/fuel mixtures with high oxygen concentrations of air may have higher flame temperatures (e.g., 4000° F.), and thus produce more $NO_x$, than stoichiometric air/fuel mixtures with lower oxygen concentrations of air. Lean air/fuel mixtures may be used to decrease NO emissions. However, lean air/fuel mixtures may be less stable than stoichiometric or rich air/fuel mixtures. Additionally, combusting cooler air/fuel mixtures may be less stable than combusting warmer air/fuel mixtures. Combusting unstable air/fuel mixtures may produce undesirable vibrations and/or stalling of the gas turbine system 10. Despite lower flame temperatures from lean air/fuel mixtures, the temperature of the exhaust gases 24 may still be between approximately 2800° F.-3000° F. The turbine blades 34 may still require at least some of the cooling features described above to perform optimally with high temperature exhaust gases 24.

The exhaust gases 24 from the combustion of lean air/fuel mixtures may have a substantially lower oxygen concentration than before combustion. For example, the exhaust gases 24 may have an oxygen concentration between approximately 5-15%. The oxygen concentration of the exhaust gases 24 depends at least in part on the quality of the air/fuel mixture. For example, exhaust gases 24 from a lean air/fuel mixture may have higher oxygen concentrations (e.g., approximately 15%) whereas exhaust gases 24 from a rich air/fuel mixture may have lower oxygen concentrations (e.g., approximately 5%). In some embodiments, the EGR system 42 diverts the exhaust gas portion 44 at a diversion point 94 along the turbine combustor 14, such that the exhaust gas portion 44 is recirculated to a recirculation point 96. The recirculation point 96 may be any point along the flow path of the compressed air 22 between the compressor 12 and the diversion point 94. The EGR system 42 diverts the exhaust gas portion 44 through one or more ducts 146 that may include one or more conduits, pipes, or other passages. The recirculation point 96 of each duct 146 may be any point along the flow path of the compressed air 22 between the compressor 12 and the diversion point 94, such as the head end 72. In some embodiments, the EGR system 42 may recirculate the exhaust gas portion 44 at a recirculation point 96 in the head end 72 to be mixed with the air 22, fuel 20, and/or air/fuel mixture 36 upstream of the fuel nozzles 18. In other embodiments, the EGR system 42 may recirculate the exhaust gas portion 44 at a recirculation point 96 in the head end 72 to be mixed with the air/fuel mixture downstream of the fuel nozzles 18. The exhaust gas portion 44 dilutes the oxygen concentration of the air/fuel mixture 36, lowering the amount of oxygen available for reaction with the fuel 20 in the combustion chamber 78. The oxygen concentration of the diluted air/fuel mixture 36 depends on the relative quantity of the exhaust gas portion 44, the amount of dilution air 92 in the exhaust gas portion 44, and the oxygen concentration of the dilution air 92. Mixing the exhaust gas portion 44 with the compressed air 22 between the recirculation point 96 and the turbine combustor 14 may warm the compressed air 22 to a greater extent than warming the compressed air 22 by passing it alone through the flow sleeve 82. Thus mixing the exhaust gas portion 44 with the compressed air 22 may increase the stability of combustion. Lower oxygen concentrations in the air/fuel mixture 36 resulting from recirculating an exhaust gas portion 44 may lower the stoichiometric flame temperature and reduce $NO_x$ emissions.

Figure 3:
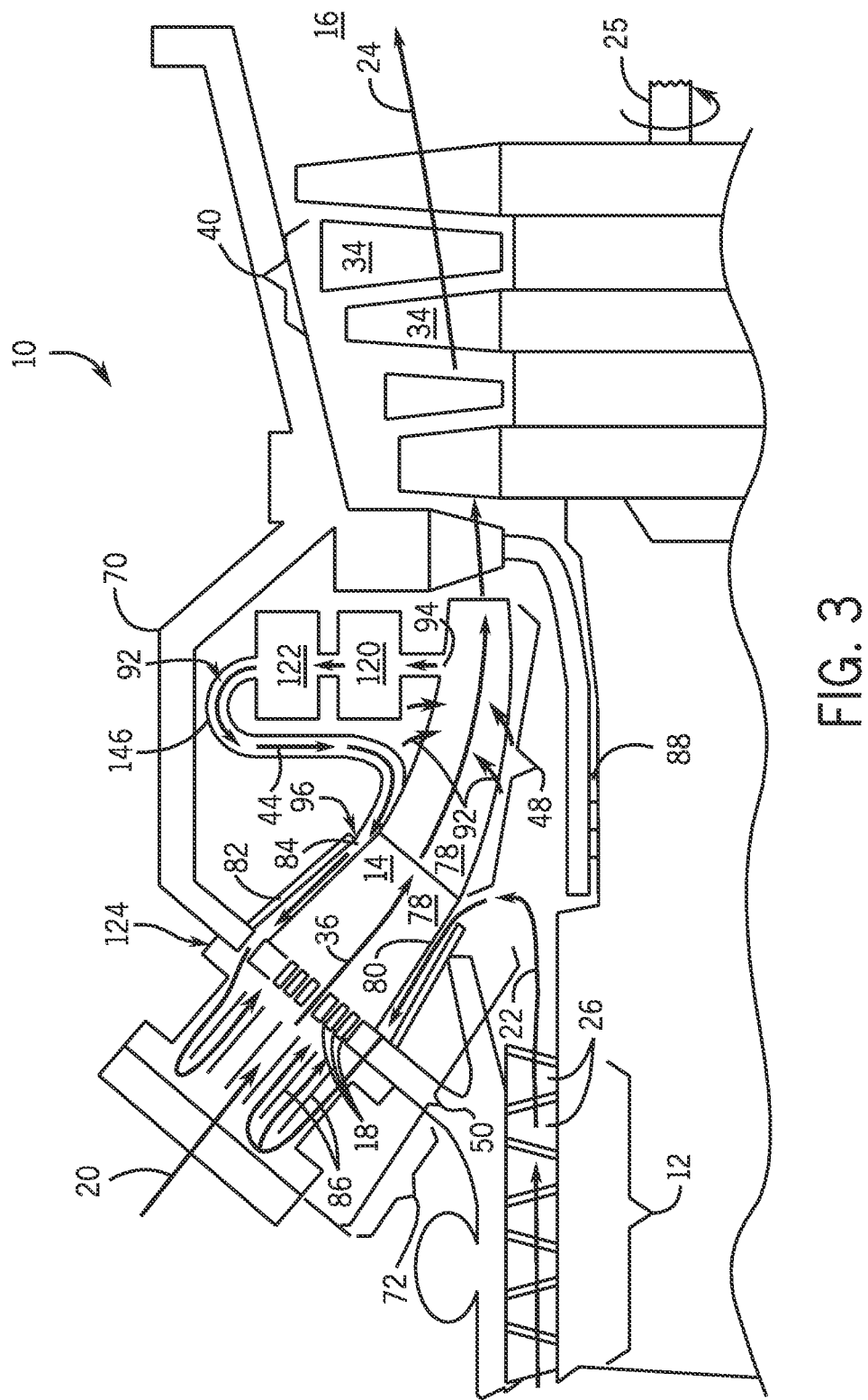
FIG. 3 is a cross-sectional side view of an embodiment of the turbine combustor of FIG. 2, wherein the recirculated exhaust gas portion passes through the flow sleeve.
Figure 4:
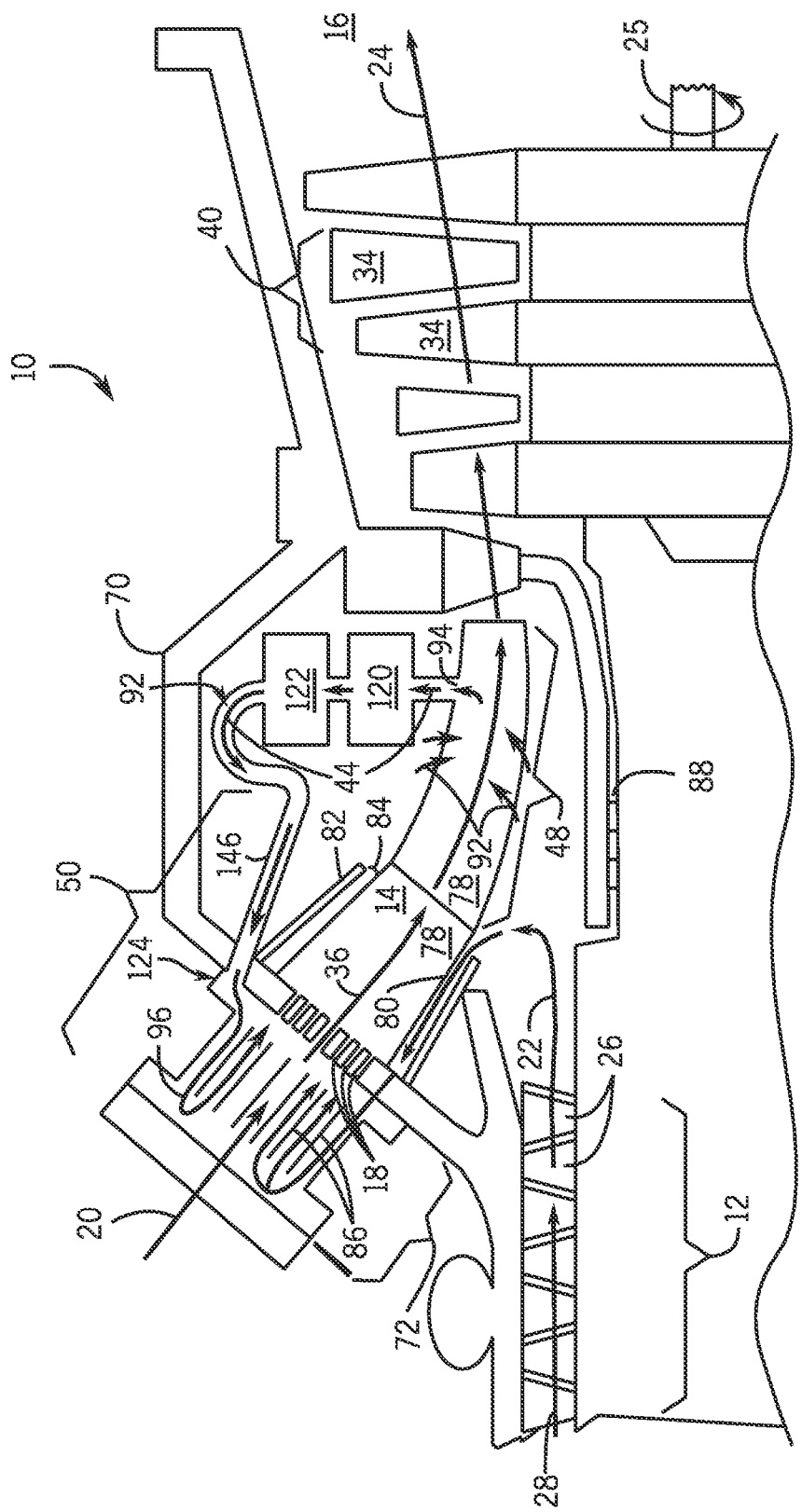
FIG. 4 is a cross-sectional side view of an embodiment of the turbine combustor of FIG. 2, wherein the recirculated exhaust gas portion passes outside the flow sleeve.

The exhaust gases 24 leaving the turbine combustor 14 may be at a higher temperature and lower pressure than the compressed air 22 and fuel 20 in the air/fuel mixture 36. As shown in FIGS. 3 and 4, some embodiments of the EGR system 42 may include a cooling stage 120 and a pressure increasing device 122. In some embodiments, the EGR system may be entirely enclosed within the compressor discharge casing 70. The cooling stage 120 may be utilized such that components of the EGR system 42, the turbine combustor 14, and/or the fuel nozzles 18 do not accept exhaust gases 24 at high temperatures to the detriment of the useful life of these components. The pressure increasing device 122 may be utilized such that the exhaust gas portion 44 may overcome any upstream pressure associated with the turbine combustor 14. More specifically, the pressure increasing device 122 may increase the pressure of the exhaust gas portion 44 such that the upstream pressures (e.g., pressure of compressed air 22) at the recirculation point 96 are overcome.

While the EGR system 42 accepts only the portion 44 of the exhaust gases 24, the exhaust gas portion 44 may be at a relatively high temperature. Cooling the exhaust gas portion 44 may extend the useful life of the pressure increasing device 122, the fuel nozzles 18, the head end 72, and so forth. In certain embodiments, the cooling stage 120 may receive the exhaust gas portion 44 at temperature ranges including, but not limited to, approximately 2500° F. to approximately 3500° F., approximately 2700° to approximately 3200° F., approximately 2800° F. to approximately 3100° F., and so forth. In certain embodiments, the cooling stage 120 may cool the exhaust gas portion 44 to temperature ranges including, but not limited to, approximately 1300° F. to approximately 1600° F., approximately 1350° to approximately 1550° F., approximately 1400° F. to approximately 1500° F., and so forth. In some embodiments, the cooling stage 120 may include any type of heat exchanger known in the art, such as cooling coils and cooling plates. In other embodiments, the cooling stage 120 may transfer heat by pre-heating the fuel 20 and/or the compressed air 22. Pre-heating the fuel 20 and/or the compressed air 22 may increase the stability of combustion in the combustion chamber 78, thus enabling more uniform combustion throughout the turbine combustor 14. In still other embodiments, dilution air 92 may be used in the cooling stage 120 to cool the exhaust gas portion 44. The cooling stage 120 may also include any combination of heat exchangers, pre-heating systems, or dilution air cooling system.

Upon cooling, the pressure increasing device 122 increases the pressure of the exhaust gas portion 44 enough to overcome the combustor upstream pressure and force the exhaust gas portion 44 into the combustion system at the recirculation point 96. The combustor upstream pressure may be the pressure at the recirculation point 96 where the exhaust gas portion 44 is mixed with the compressed air 22 or the air/fuel mixture 36. In some embodiments, the pressure increasing device 122 may receive the exhaust gas portion 44 at pressure ranges including, but not limited to, approximately 586-689 kPa (85-100 psi), approximately 621-655 kPa (90-95 psi), approximately 634-648 kPa (92-94 psi), and so forth. The combustor upstream pressure (to which the pressure increasing device 122 increases the pressure of the exhaust gas portion 44) may be at pressure ranges including, but not limited to, approximately 655-827 kPa (95-120 psi), approximately 689-793 kPa (100-115 psi), approximately 689-724 kPa (100-105 psi), and so forth. Without the pressure increasing device 122, the exhaust gas portion 44 may be prevented from recirculating back into the combustion system. For example, if the combustor upstream pressure is 689 kPa (100 psi), the exhaust gas portion 44 at 662 kPa (96 psi) may not be forced to recirculate unless it is further pressurized. Some of the compressed air 22 may even backflow into the EGR system 42 due to the higher pressure of the compressed air 22. However, in this example, by increasing the pressure of the exhaust gas portion 44 through the pressure increasing device 122 to greater than or equal to 689 kPa (100 psi), the exhaust gas portion 44 may be forced to recirculate into the compressed air 22 or the air/fuel mixture 36.

In some embodiments, the pressure increasing device 122 may be a compressor, such as a centrifugal compressor, reciprocating compressor, or axial compressor. The pressure increasing device 122 may be driven by the turbine shaft 25 directly or indirectly. Embodiments in which the pressure increasing device 122 is driven indirectly by the turbine shaft 25 may include a compressor powered by electricity generated directly from the turbine shaft 25. Alternatively, the pressure increasing device 122 driven directly by the turbine shaft 25 may include an axial compressor. In certain embodiments, the pressure increasing device 122 and the cooling stage 120 are the same, such as an axial compressor with cooling compressor blades.

In each embodiment, both the cooling stage 120 and the pressure increasing device 122 are entirely enclosed within the compressor discharge casing 70. However, the recirculation route of the exhaust gas portion 44 through the EGR system 42 may vary between embodiments. For example, in FIG. 3, the one or more ducts 146 direct the recirculated exhaust gas portion 44 through the annulus 84 between the liner 80 and the flow sleeve 82 of the turbine combustor 14 to reach the head end 72. In another embodiment shown in FIG. 4, the one or more ducts 146 direct the recirculated exhaust gas portion 44 into the head end 72 without passing through the annulus 84. The one or more ducts 146 of the EGR system 42 described herein may direct the recirculated exhaust gas portion 44 to one or more recirculation points 96 by any route internal to the compressor discharge casing 70. Furthermore, the one or more ducts 146 may include one or more conduits, pipes, or other passages.

In some embodiments, the exhaust gas portion 44 may be recirculated with either the compressed air flow 22 or the fuel 20 in the upstream end 50 of the turbine combustor 14 before mixing with the other constituent 22, 20 to form the air/fuel mixture 36. In certain embodiments, as illustrated in FIG. 3, the recirculation point 96 may be with the compressed air flow 22 in the flow sleeve 82. In this embodiment, the exhaust gas portion 44 may be mixed with the compressed air 22 before reaching the head end 72, diluting the oxygen concentration of the compressed air 22 and preheating the compressed air 22. This may cause the exhaust gas portion 44 to be distributed relatively equally among the fuel nozzles 18 such that oxygen concentration of the air/fuel mixture 36 is uniform in the combustion chamber 78. In another embodiment, the recirculation point 96 may be in the head end 72, but the one or more ducts 146 may direct the exhaust gas portion 44 through the annulus 84 with the compressed air flow 22. In this embodiment, the compressed air flow 22 may be preheated by the exhaust gas portion 44 but not diluted until reaching the head end 72.

In another embodiment, the recirculation point 96 of the exhaust gas portion 44 may be a certain fuel nozzle 18, a certain plurality of fuel nozzles 18, or certain sector of fuel nozzles 18, such that the oxygen concentration of the air/fuel mixture 36 in only these fuel nozzles 18 is diluted. In other embodiments, the recirculation point 96 may be after the compressed air 22 and the fuel 20 have been mixed in the fuel nozzles 18. As discussed above, mixing the exhaust gas portion 44 with the air/fuel mixture 36 may dilute the oxygen concentration, lower stoichiometric flame temperature, increase stability of combustion, and reduce harmful emissions (e.g., $NO_x$). In some embodiments, the exhaust gas portion 44 may be forced directly into the combustion chamber 78.

Figure 5:
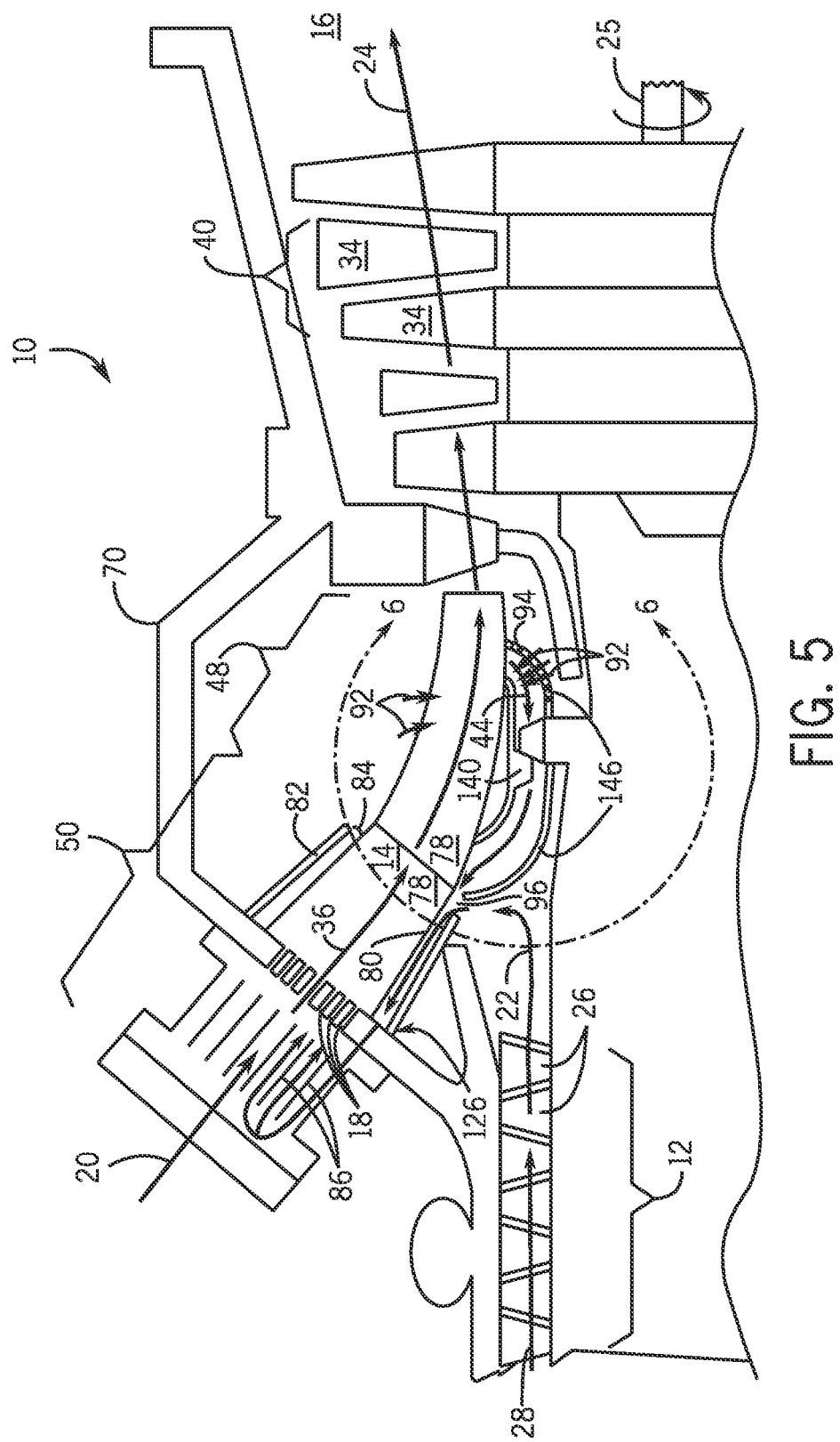
FIG. 5 is a cross-sectional side view of an embodiment of the turbine combustor of FIG. 2, including the exhaust gas recirculation directly driven by turbomachinery.
Figure 6:
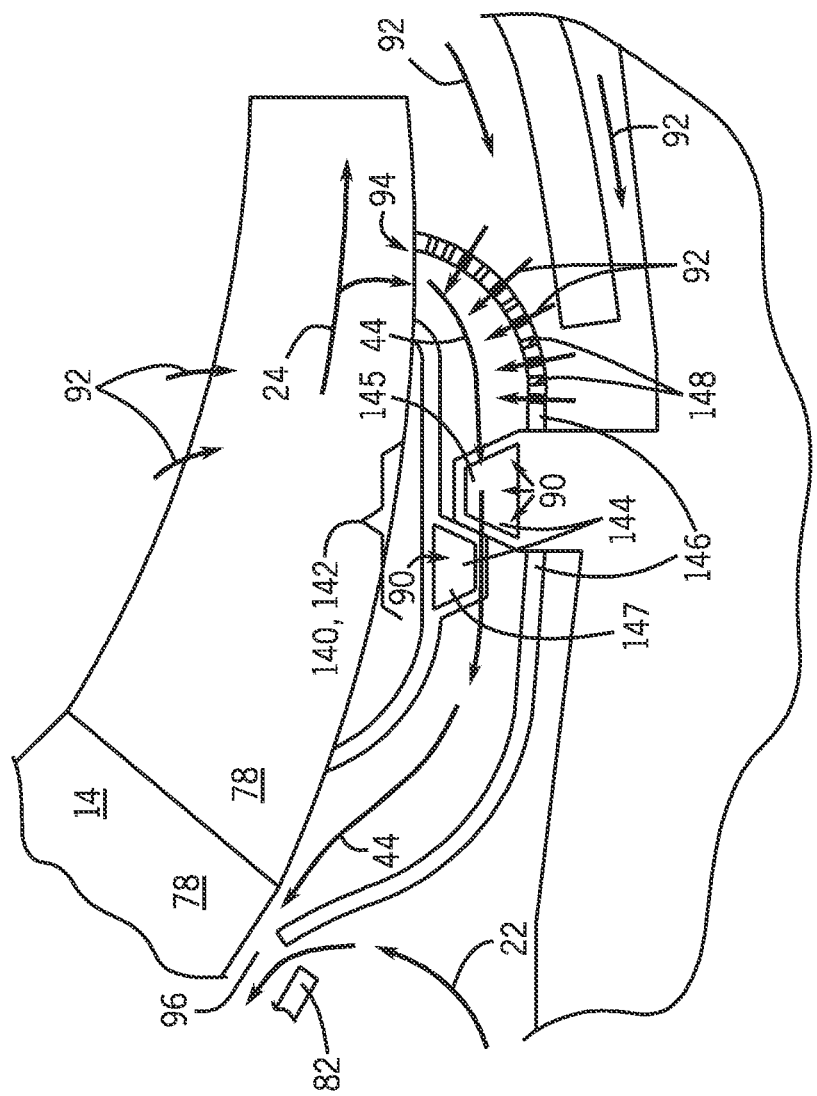
FIG. 6 is a close-up view of an embodiment of the exhaust gas recirculation of FIG. 5, including inlets for dilution air and cooling air.

In some embodiments, the exhaust gas portion 44 may be forced to recirculate at a plurality of recirculation points 96 in the annulus 84 and/or the head end 72. For example, FIGS. 2-4 illustrate the exhaust gas portion 44 forced to recirculate into the top 124 of the head end 72, whereas FIGS. 5 and 6 illustrate the exhaust gas portion 44 forced to recirculate through the bottom 126 of the head end 72. Additionally, the exhaust gas portion 44 may be diverted from the main flow of the exhaust gases 24 from the turbine combustor 14 at one or more diversion points 94. In some embodiments, the quantity of the exhaust gas portion 44 diverted from the main flow of the exhaust gases 24 may be increased or decreased to affect the oxygen concentration dilution of the air/fuel mixture 36 entering the turbine combustor 14. In other embodiments, the quantity of the pressure increase imparted by the pressure increasing device 122 may be adjusted. For example, in certain embodiments, the pressure increasing device 122 may increase the pressure of the exhaust gas portion 44 by, including but not limited to, approximately 5%, approximately 10%, or 15%. High exhaust gas portions 24 may decrease $NO_x$ emissions and increase the stability of combustion. However, low exhaust gas portions 44 may increase $NO_x$ emissions and decrease the stability of combustion.

In certain embodiments, the EGR system 42 may be driven directly by turbomachinery 140 as illustrated in FIGS. 5 and 6. The turbomachinery 140 may be both the cooling stage 120 and the pressure increasing device 122. In this embodiment, the turbomachinery 140 pulls an exhaust gas portion 44 from the exhaust gases 24 at the downstream end 48 of the turbine combustor 14. Dilution air 92 may be used to cool the exhaust gas portion 44 and the turbomachinery 140. The turbomachinery 140 compresses the exhaust gas portion 44 and dilution air 92 to recirculate into the compressed air 22 and/or the fuel 20 through the exhaust gas recirculation duct 146 upstream of the turbine combustor 14.

As illustrated in FIG. 6, the turbomachinery 140 may include an EGR compressor 142 that may include one or more stages. Like the compressor 12 for the compressed air flow 22, the EGR compressor 142 contains EGR compressor blades 144 with at least one rotating stage 145 and at least one stationary stage 147. The rotating stage 145 is coupled to the turbine shaft 25. As the turbine shaft 25 rotates, the at least one rotating stage 145 rotates to compress the exhaust gas portion 44 and pull more of the exhaust gases 24 from the combustion chamber 78 at the downstream end 48. The EGR compressor 142 may be sized to sufficiently compress the exhaust gas portion 44 to force recirculation to the upstream end 50 with the compressed air 22 and/or the fuel 20.

The EGR compressor blades 144 may operate at high temperatures similar to the turbine blades 34 due to the temperature of the exhaust gas portion 44. In some embodiments, the exhaust gas portion 44 may be cooled to extend the useful life of the compressor blades 144, the EGR duct 146, the fuel nozzles 18, and other components within the head end 72, among others. In some embodiments, the EGR compressor blades 144 may have cooling features similar to the cooling features of the turbine blades 34 to better withstand high temperatures. For example, the EGR compressor blades 144 may incorporate convection cooling, film cooling, transpiration cooling, and combinations thereof. Additionally, the EGR compressor blades 144 may be made of materials similar to the turbine blades 34, including but not limited to, titanium, Inconel, and combinations thereof.

The EGR compressor 142 pulls an exhaust gas portion 44 from the exhaust gases 24 of the turbine combustor 14 from the diversion point 94 through an EGR duct 146. The EGR duct 146 may receive the exhaust gases 24 at a temperature over approximately 2800° F. Suitable materials for the EGR duct 146 may include titanium, ceramics, or combinations thereof. The EGR compressor 142 may also pull dilution air 92 through dilution holes 148 in the EGR duct 146 as illustrated in FIG. 6. In some embodiments, the dilution air 92 is cooler than the exhaust gas portion 44, and may be used to cool the exhaust gas portion 44 and the EGR duct 146. The dilution air 92 may be pulled from the compressor discharge casing 70, from the compressed air 22, from one or more turbine stages 40, or combinations thereof. In some embodiments, the dilution air 92 and cooling features of the EGR compressor blades 144 may lower the temperature of the exhaust gas portion 44 from approximately 3000° F. to between approximately 1300° F. and 1600° F.

The compressed exhaust gas portion 44 exiting the EGR compressor 142 flows to either the head end 72 or the turbine combustor 14 with sufficient pressure to be recirculated. For example, the exhaust gases 24 in the combustion chamber 78 may be at 648 kPa (94 psi) and the compressed air 22 may be at 689 kPa (100 psi). The EGR compressor 142 may compress the exhaust gas portion 44 to at least 689 kPa (100 psi). As discussed above, the compressed exhaust gas portion 44 may be forced to recirculate with the compressed air 22, the fuel 20, and/or the air/fuel mixture 36 in the head end 72 to dilute the oxygen concentration, depress the stoichiometric flame temperature, and reduce $NO_x$ emissions.

Figure 7:
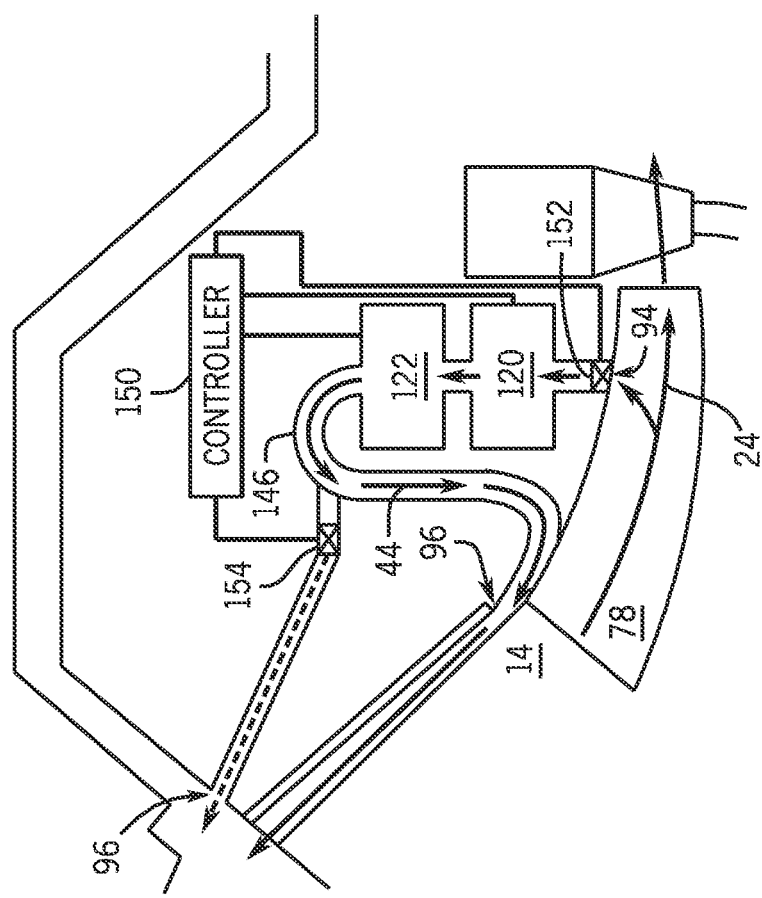
FIG. 7 illustrates a control system that may dynamically control the operation of the exhaust gas recirculation system.

FIG. 7 illustrates a control system that may dynamically control the operation of the EGR system 42 described herein through the use of a controller 150. For example, in some embodiments in which the EGR system 42 includes an EGR compressor 142 as both the pressure increasing device 122 and the cooling stage 120, the EGR compressor 142 may be selectively engaged by the controller 150 so that the exhaust gas portion 44 is recirculated only when desired. In other embodiments, the controller 150 may dynamically adjust the relative quantity of the exhaust gas portion 44 diverted into the exhaust gas recirculation duct 146. For example, in certain embodiments, the controller 150 may be configured to operate a first valve 152 or other device at the diversion point 94. In other embodiments, the controller 150 may dynamically adjust the operation of the pressure increasing device 122 and/or cooling stage 120 separately. For example, the controller 150 may adjust the pressure increasing device 122 to increase the pressure of the exhaust gas portion 44. In other embodiments, the controller 150 may dynamically adjust the temperature decrease provided to the exhaust gas portion 44 by the cooling stage 120. In some embodiments, the controller 150 may adjust the amount of cooling air 90 or dilution air 92. In other embodiments, the controller 150 may adjust the amount and/or flow of another cooling fluid used in the cooling stage 120. Additionally, in some embodiments, the controller 150 may dynamically change the recirculation point 96 through a second valve 154. It will be appreciated that, in certain embodiments, the controller 150 may include one or more computer readable medium (e.g., a hard drive) comprising computer readable control instructions, and one or more processors for executing the control instructions. However, the controller 150 may include other software, hardware, or a combination thereof, capable of implementing the control techniques described herein.

The EGR system 42 is not limited by an available static pressure as with ejectors or fluidics. As an example, the EGR compressor 142 may have a throttling feature, so that as the turbine 16 produces more work to rotate the turbine shaft 25 more quickly, and the compressor 12 compresses the air to a higher pressure, the controller 150 may throttle up the EGR compressor 142 to sufficiently compress the exhaust gas portion 44 to force recirculation. In other embodiments, as the turbine shaft 25 of the compressor 12, turbine 16, and EGR compressor 142 changes rotational speed, the EGR compressor 142 may compress the exhaust gas portion 44 to a sufficient pressure to recirculate at the recirculation point 96. Some embodiments of the EGR system 42 are internal to the gas turbine system 10 and require no external energy sources, heat exchangers, or pressure increasing devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine combustor of a turbine system, wherein the turbine combustor is at least partially enclosed within a compressor discharge casing of the turbine system, the turbine combustor generating an exhaust gas;
an exhaust gas recovery system, comprising an exhaust gas recirculation duct configured to recirculate a mixture of the exhaust gas and dilution air from a compressor, the mixture recirculated from a downstream end of the turbine combustor to an upstream end of the turbine combustor via an annulus between a liner and a flow sleeve, wherein the exhaust gas recirculation duct is entirely enclosed within the compressor discharge casing; and
a turbomachinery stage comprising a rotating stage and a stationary stage, both of which are at least partially disposed within the exhaust gas recirculation duct, wherein the rotating stage is coupled to a rotating shaft of the turbine system such that rotation of the rotating shaft causes the rotating stage to rotate with respect to the stationary stage to cause the mixture of the exhaust gas and the dilution air to be recirculated through the exhaust gas recirculation duct.

2. The system of claim 1, wherein the exhaust gas recirculation duct delivers the mixture of the exhaust gas and the dilution air into a head end of the turbine combustor.

3. The system of claim 2, wherein the exhaust gas recirculation duct delivers the mixture of the exhaust gas and the dilution air into a fuel stream upstream of a fuel nozzle disposed in the head end of the turbine combustor, wherein the fuel stream is mixed with an air stream in the fuel nozzle.

4. The system of claim 2, wherein the exhaust gas recirculation duct delivers the mixture of the exhaust gas and the dilution air into an air stream upstream of a fuel nozzle disposed in the head end of the turbine combustor, wherein the air stream is mixed with a fuel stream in the fuel nozzle.

5. The system of claim 2, wherein the exhaust gas recirculation duct delivers the mixture of the exhaust gas and the dilution air into an air/fuel mixture downstream of a fuel nozzle disposed in the head end of the turbine combustor.

6. The system of claim 1, wherein the exhaust gas recirculation duct delivers the mixture of the exhaust gas and the dilution air into a combustion chamber of the turbine combustor.

7. The system of claim 1, wherein the liner and the flow sleeve are disposed about a combustion chamber of the turbine combustor.

8. The system of claim 1, comprising a plurality of dilution air holes in the exhaust gas recirculation duct, wherein rotation of the rotating stage with respect to the stationary stage causes air within the compressor discharge casing to pass through the plurality of dilution holes as the dilution air to be recirculated through the exhaust gas recirculation duct with the exhaust gas.

9. A system, comprising:
a turbine combustor of a turbine system, wherein the turbine combustor is at least partially enclosed within a compressor discharge casing of the turbine system, the turbine combustor generating an exhaust gas; and
an exhaust gas recovery system, comprising:
an exhaust gas recirculation duct configured to recirculate the exhaust gas from a downstream end of the turbine combustor to an upstream end of the turbine combustor;
a cooling stage decreasing a temperature of the exhaust gas recirculated through the exhaust gas recirculation duct; and
a pressure increasing device actively imparting energy to the exhaust gas to increase a pressure of the exhaust gas recirculated through the exhaust gas recirculation duct, the pressure increasing device comprising a rotating stage and a stationary stage, both of which are at least partially disposed within the exhaust gas recirculation duct, wherein the rotating stage is coupled to a rotating shaft of the turbine system such that rotation of the rotating shaft causes the rotating stage to rotate with respect to the stationary stage to cause the exhaust gas to be recirculated through the exhaust gas recirculation duct;
wherein the exhaust gas recirculation duct, the cooling stage, and the pressure increasing device are all entirely enclosed within the compressor discharge casing.

10. The system of claim 9, wherein the exhaust gas recirculation duct delivers the exhaust gas into a head end of the turbine combustor.

11. The system of claim 10, wherein the exhaust gas recirculation duct delivers the exhaust gas into a fuel stream upstream of a fuel nozzle disposed in the head end of the turbine combustor, wherein the fuel stream is mixed with an air stream in the fuel nozzle.

12. The system of claim 10, wherein the exhaust gas recirculation duct delivers the exhaust gas into an air stream upstream of a fuel nozzle disposed in the head end of the turbine combustor, wherein the air stream is mixed with a fuel stream in the fuel nozzle.

13. The system of claim 10, wherein the exhaust gas recirculation duct delivers the exhaust gas into an air/fuel mixture downstream of a fuel nozzle disposed in the head end of the turbine combustor.

14. The system of claim 9, wherein the exhaust gas recirculation duct delivers the exhaust gas into a combustion chamber of the turbine combustor.

15. The system of claim 9, wherein the exhaust gas recirculation duct delivers the exhaust gas into an annulus between a liner and a flow sleeve, wherein the liner and the flow sleeve are disposed about a combustion chamber of the turbine combustor, and wherein the annulus delivers compressed air from a compressor and the exhaust gas to a head end of the turbine combustor.

16. A system, comprising:
a turbine combustor of a turbine system, wherein the turbine combustor is at least partially enclosed within a compressor discharge casing of the turbine system;
an exhaust gas recovery system comprising an exhaust gas recirculation duct configured to recirculate exhaust gas from a downstream end of the turbine combustor to an upstream end of the turbine combustor, wherein the exhaust gas recirculation duct is entirely enclosed within the compressor discharge casing;
a compressor of the turbine system, wherein the compressor is coupled to a rotating shaft of the turbine system such that rotation of the rotating shaft causes blades of the compressor to rotate to deliver compressed air from the compressor to a head end of the turbine combustor; and a turbomachinery stage comprising a rotating stage and a stationary stage, both of which are at least partially disposed within the exhaust gas recirculation duct, wherein the rotating stage is coupled to the rotating shaft of the turbine system such that rotation of the rotating shaft causes the rotating stage to rotate with respect to the stationary stage to cause the exhaust gas to be recirculated through the exhaust gas recirculation duct.

17. The system of claim 16, comprising a plurality of dilution air holes in the exhaust gas recirculation duct, wherein rotation of the rotating stage causes air from the compressor or compressor discharge casing to pass through the plurality of dilution holes to be circulated through the exhaust gas recirculation duct with the exhaust gas.

* * * * *